United States Patent

[11] 3,564,127

[72] Inventors George C. Sziklai
Los Altos Hills, Calif.;
George F. Newell, Pittsburgh, Pa.

[21] Appl. No. 711,690
[22] Filed Mar. 8, 1968
[45] Patented Feb. 16, 1971
[73] Assignee Westinghouse Electric Corporation
Pittsburgh, Pa.

[54] SYSTEM OF BAND COMPRESSION FOR VIDEO SIGNALS
5 Claims, 16 Drawing Figs.

[52] U.S. Cl. .......... 178/6.6
[51] Int. Cl. .......... H04n 1/36, H04n 7/12
[50] Field of Search .......... 178/6 (BWR), 6.6 (A), 6.6 (FSS), 6.6 (DD); 179/100.2 (T)

[56] References Cited

UNITED STATES PATENTS

| | | | |
|---|---|---|---|
| 2,878,310 | 3/1959 | Becker | 178/6 |
| 3,478,164 | 11/1969 | Southworth | 178/6.6 |
| 2,874,214 | 2/1959 | Anderson | 178/6.6A |
| 2,955,159 | 10/1960 | Jones, Jr. | 178/6 |
| 3,134,853 | 5/1964 | Okamura | 178/6.6A |
| 3,284,567 | 11/1966 | Southworth | 178/6 |
| 3,423,526 | 1/1969 | Law | 178/6 |

*Primary Examiner*—Bernard Konick
*Assistant Examiner*—Steven B. Pokotilow
*Attorneys*—F. H. Henson, C. F. Renz and R. L. Gable

ABSTRACT: This invention relates to a method and system for band-compressing video signals including a continuous storage medium such as a magnetic disc or drum and a sampling circuit for variously reading or writing selected samples to and from the continuous storage medium. In converting a typical horizontally swept, fast-scan video signal to a slow-scan signal, the fast-scan video signal corresponding to an image is recorded upon the storage medium and is repeatedly played back while the sampling circuit samples elements of the signal corresponding to one element from each of the horizontal lines so that the resulting slow-scan, distributed signal appears as if the image were vertically scanned. In order to convert the slow-scan signal into a fast-scan signal, the distributed, slow-scan signals are selected by a sampling circuit and recorded onto a continuous storage medium during many revolutions of the storage medium until the entire fast-scan signal has been built-up in a manner that the recorded signal may be played back rapidly to provide a normal horizontal, fast-scan video signal.

FIG. 1.

WITNESSES:

Leon M. Garman

James F. Young

INVENTORS
George C. Sziklai and
George F. Newell
BY R. Lewis Gable
ATTORNEY

SYSTEM OF BAND COMPRESSION FOR VIDEO SIGNALS

BACKGROUND OF THE INVENTION

1. Field of the Invention

This invention relates to methods and systems for converting fast-scan video signals to distributed, slow-scan signals which may be transmitted or stored upon low bandwidth media and in the reverse, to convert a slow-scan, distributed signal to a fast-scan, video signal.

2. Description of the Prior Art

In the handling and processing of video images, it is often necessary to convert a fast-scan, high bandwidth signal to a low bandwidth signal and vice versa. In order to display a video television signal, it is typically necessary to use a cathode ray tube in which the video information is scanned in a line by line mode onto a phosphor screen. Visual presentation by conventional television display devices such as the cathode ray tube requires that the picture be displayed at a sufficiently rapid rate in order to avoid flicker. However, the source of the video information may be a transmission line or storage medium that does not have the capacity to provide a high bandwidth, fast-scan signal that could be directly applied to a cathode ray tube to provide an acceptable image. It is particularly noted that the high bandwidth storage media or transmission lines are normally more expensive in terms of original cost and use than the available low bandwidth transmission lines or storage media. Therefore, for economical reasons, it becomes desirable to utilize the low bandwidth sources of television video signals.

However, in order to display a slow-scan signal, it will be necessary to employ a bandwidth conversion system in which the distributed, slow-scan signal is selectively applied to a storage medium to be built up over a prolonged period of time. After the entire video signal has been recorded, the video signal may be played back continuously at a faster rate to provide a fast-scan video signal which is capable of being displayed without flicker upon a cathode ray tube. In other words, the video signal may be repeatedly played back from the storage medium many times to provide a video image at the required faster rate upon the cathode ray tube.

Further, it may be desirable to view a still image in a relatively short period of time and to generate a video signal corresponding to the image over a prolonged period of time. Television cameras such as the slow-scan vidicon tubes are capable of being exposed to a scene for a fraction of a second and of slowly reading out the stored signal over a long period of time. Such slow-scan vidicon tubes are however extremely sensitive to ambient temperatures. Alternatively, caption scanners may be used to provide a distributed, low bandwidth signal; however, caption scanners do not take advantage of the time storage and the field of view which is being imaged and must be kept in a stationary position for the total time of many seconds as determined by the display time. This requirement leads to the need for the duplication of scanners so that one scanner may be changed while the other caption scanner is generating the slow-scan, distributed signal. In addition, caption scanners are not convenient for use in viewing live scenes.

Therefore, in many instances it may be preferable to use a standard television camera which is scanned to derive a video signal at the normal high scan rates. In such a system, a single frame may be selected to be applied to a scan converter to produce a slow-scan waveform. In order to transmit or store the high scan television signal on a low bandwidth storage medium, it will be necessary to store the high scan video signal upon the suitable storage medium during a relative short period of time and then to sample the storage medium in a regular pattern at the desired slow rate while the stored signal is repeatedly reproduced. The sampled signal may then be stored or transmitted upon relatively inexpensive, low bandwidth media.

In one particular instance, it may be desirable to place a video signal onto an inexpensive low bandwidth medium such as tape or phonograph record. As described in a copending application, entitled "Teaching Methods and Apparatus," by Donald W. Laviana, Ser. No. 371,360, now abandoned, television signals may be stored upon a phonograph record by converting a high bandwidth signal to a low or narrow bandwidth signal to be placed on the phonograph record. The phonograph record may be played upon a conventional record player to provide images upon a display device at normal television scan rates. The low cost and flexibility of using a phonograph record to store video signals requires the use of bandwidth converters for first reducing the bandwidth of a signal provided by a fast-scan television camera and for converting the slow bandwidth signal provided by the record to a fast-scan signal to be applied to a suitable display device.

In the present state of the art, there are available scan converters which are capable of effecting conversions between fast and slow scan signals. Typical of the prior art is the use, in combination, of a slowly swept kinescope and optically focused camera tube of the multireadout type such as a Permachron tube. Alternatively, an electrical-in electrical-out storage tube may be used to first write as by scanning the video signal upon the target of the device at a slow-scan rate and then to read at a faster rate to derive a fast scan video signal. Illustratively, the electrical-in and electrical-out storage tube may include a target element disposed between two electron guns for respectively reading and writing the video signal upon the target element. These storage tubes suffer the comparative disadvantages of poor resolution, low signal strength, and poor storage capability due to the difficulties associated with the repeated readout of the charge image deposited upon the target. In addition, it is difficult to provide exact registration between the first and second electron guns which may provide additional distortion in the output signal.

Basically the process of converting a fast-scan to a slow-scan signal is that of first storing the fast scan signal upon a suitable medium and then while repeatedly replaying the fast-scan signal, periodically sampling the fast-scan signal to provide a low bandwidth, distributed signal. In order to display the transmitted signal at suitable fast scan rates, it is necessary to successively record the distributed, low bandwidth signal onto a suitable storage medium until a single, complete frame of the video signal has been built up. The distributed, low bandwidth signal is applied to the storage medium in a manner that may be readout in a recognizable form when the storage medium is played back to provide a video image at sufficiently high rates to avoid flicker. Typically, the low bandwidth distributed signal has been sampled or arranged so that it is not easily recognizable as a part of the video image.

It is therefore an object of this invention to provide a method and system for converting fast-scan to slow-scan video signals in which the sampling is carried out to provide a slow-scan signal which is related to the line structure of the video image.

It is a further object of this invention to provide a scan conversion system and method in which the output, video signal of a television camera may be easily converted from a fast-scan signal to a slow-scan signal.

It is a more particular object of this invention to provide a method and system of bandwidth conversion that incorporates the use of such continuous loop storage media such as magnetic drums or discs and which may flexibly be used to effect video conversions either from a fast-scan to slow-scan signal or in the reverse, from a slow-scan to fast-scan signal.

SUMMARY OF THE INVENTION

These and other objects are accomplished in accordance with the teachings of the present invention by providing a new and improved method and system of band conversion of video signals including a suitable storage medium and a sampling circuit for recording or playing back selected elements of the video signals upon or from the storage medium. In normal television processing, the video image is made up of a plurality of horizontal lines which are successively scanned to provide the entire video image. In accordance with the teachings of this invention, the sampling circuit selects from the horizontal lines of the video image so that the resultant low bandwidth, distributed signal is a series of elements corresponding to the vertical lines of the original video image. In the conversion of a fast-scan to slow-scan video signal, the fast-scan signal is stored upon the storage medium and then repeatedly played back while the sampling circuit samples picture elements from successive horizontal lines of the video image, which picture elements correspond to a vertical line of the video image. Illustratively, a first sample would be taken from the first horizontal line and the second sample would be taken from the second horizontal line at a point displaced vertically from the first sampled point. In this manner, the video image is sampled vertical line by vertical line until after repeated playbacks of the fast-scan signal, the entire video image has been sampled.

In order to convert the slow-scan distributed signal to a fast-scan signal capable of being displayed on a suitable display device such as the cathode ray tube, the distributed signal is selectively recorded onto the storage medium during successive cycles of the storage medium so that the original format of the video image will be reconstructed. Illustratively, this process requires the recording during the first cycle those elemental portions corresponding to the first vertical, video line of information onto the storage medium. Next, during the second cycle of the storage medium, the elemental portions of the video signal corresponding to the second vertical, video line are recorded so that the adjacent horizontal elements are recorded next to each other upon the storage medium. After repeated cycling of the storage medium, successive vertical lines of the low bandwidth distributed signal are placed upon the storage medium so that the horizontal line structure of the video signal is reconstructed and a fast-scan video signal may be played back from the storage medium to be displayed upon a conventional cathode ray tube.

DESCRIPTION OF THE DRAWINGS

These and other objects and advantages of the invention will become more apparent when considered in view of the following detailed description and drawings, in which.

DESCRIPTION OF THE PREFERRED EMBODIMENT

Figure 1:
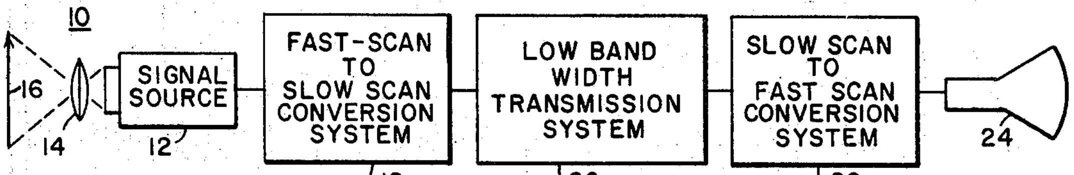
FIG. 1 is a schematic diagram of an image transmission system including a fast-scan to slow-scan conversion system and a slow-scan to fast-scan conversion system in accordance with the teachings of this invention.

Referring now to the drawings and in particular to FIG. 1, there is shown an image transmissive system 10 including a suitable video source 12 such as a typical television camera device for providing a fast-scan video signal corresponding to the image of a field 16 which is focused upon the source 12 by a suitable lens assembly 14. The fast-scan video signal developed by the camera device 12 is applied to a fast-scan to slow-scan conversion system 18, which stores the fast-scan signal in a relatively short period of time. The system 18 repeatedly plays back and samples the fast-scan signal in a mode to provide a distributed, slow-scan video signal. The slow-scan video signal may be applied to a low bandwidth transmission system 20. The system 20 may illustratively take the form of any narrow bandwidth transmission means such as a telephone line. Alternatively, the low bandwidth signal may be applied to a storage medium such as a phonograph or tape recorder such as described in the above-identified copending application of D. W. Laviana. In turn, the low bandwidth transmission system 20 applies the slow-scan signal to a slow-scan to fast-scan conversion system 22 which converts the slow-scan signal to a fast-scan signal for being displayed upon a suitable display device 24 such as a cathode ray tube. The slow-scan to fast-scan conversion system 22 includes means for storing and sampling the input slow-scan signal. More specifically, the sampling means selectively applies the input slow-scan signal during many revolutions or cycles of the storage medium to thereby build up a fast-scan signal in a mode that may be rapidly read from the storage medium and displayed upon the display device 24.

Figure 2:
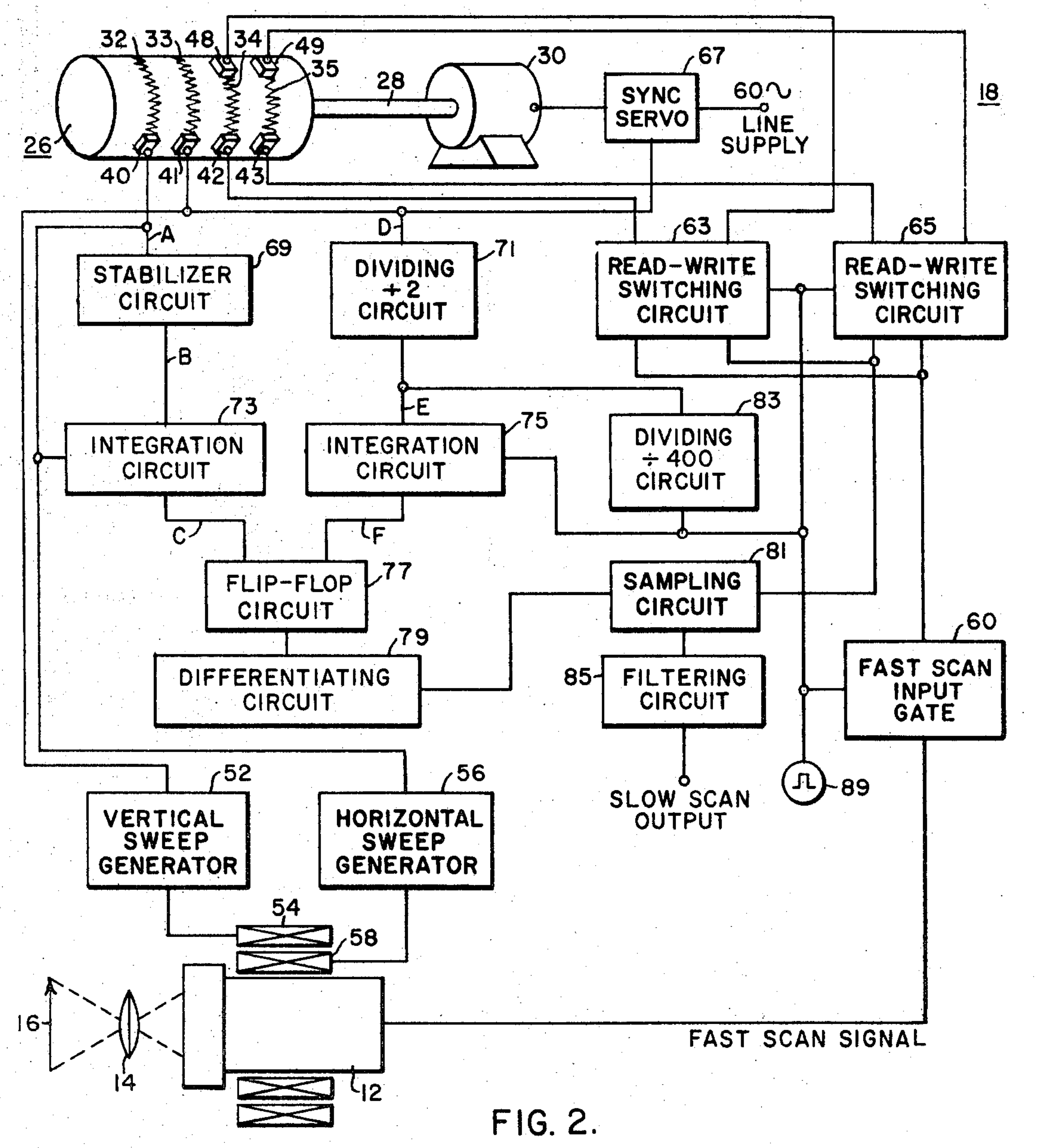
FIG. 2 shows a schematic diagram of a fast-scan to slow-scan band conversion system in accordance with the teachings of this invention.

Referring now to FIG. 2, an illustrative example of the fast-scan to slow-scan conversion system 18 is shown. The system 18 illustratively includes a continuous loop storage medium 26 such as a magnetic drum or disc, which is driven through a drive shaft 28 by a motor 30. The disc or drum 26 could illustratively include a cylindrical rotor coated with a layer of a suitable magnetic material for recording. A plurality of recording tracks 32, 33, 34 and 35 are disposed about the periphery of the storage medium 26. Playback heads 40, 41, 42 and 43 are respectively associated with the tracks 32, 33, 34 and 35 to playback or reproduce the signals which have been recorded upon these tracks. Further, recording heads 48 and 49 are respectively associated with the recording tracks 34 and 35. The fixed recording and playback heads must be suitable for relatively high resolution, i.e., 4 Mc./s response or greater, with gap and spacing dimensions suitable for recording one complete television frame on one revolution of the storage medium 26. As shown in FIG. 2, the recording and playback heads are spaced along the storage medium 26 in a direction parallel to the axis of rotation. It is noted that a single head may serve the dual function of recording and playing back a signal upon the storage medium 26.

Figure 7:
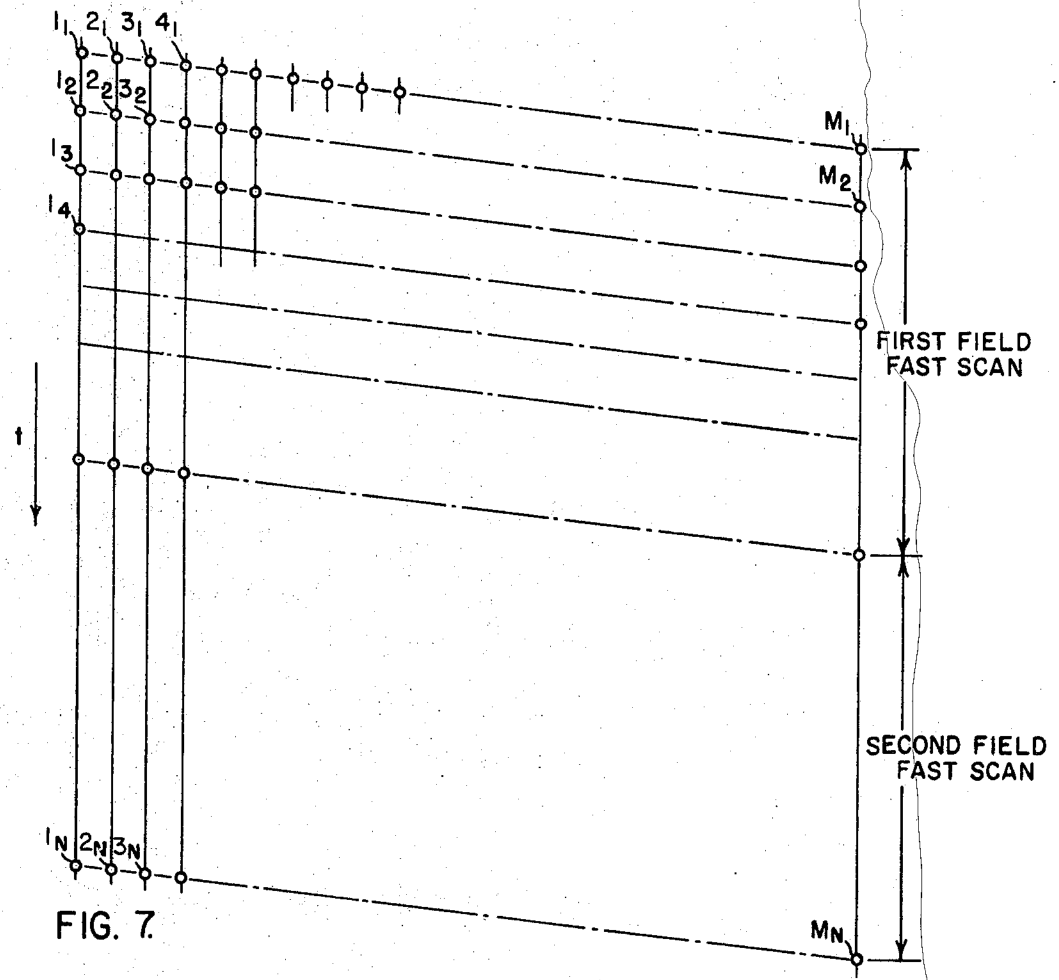
FIG. 7 is a graphical representation of the scan pattern of a television camera device which may be incorporated into FIG. 1 as the source of the fast-scan high bandwidth signal.

As shown in FIG. 2, the source 12 of a fast-scan video signal is a television camera device upon which the image of the field 16 is focused by the lens assembly 14. Illustratively, the source 12 would include a target upon which a pattern of charges would be established corresponding to the image of the field 16. In order to readout the fast-scan video signal, a beam of electrons would be scanned across the target in a pattern similar to that shown by the dash-dot lines of FIG. 7. In accordance with normal television practice, a single frame of video information is made of first and second fields. Referring to FIG. 7, it may be understood that the second field is superimposed between the lines of the first field to make up a complete video frame. The electron beam is scanned across the target of the source 12 by a vertical deflection coil 54 and a horizontal deflection coil 58. In order to synchronize the recording and playback of information from the storage medium 26, sync signals are recorded upon the recording tracks 32 and 33.

The description of the circuit 18 will be explained with regard to the conversion of a frame of the video signal having 525 vertical lines with each horizontal line having 400 picture elements, and being scanned at a rate of 60 fields per second (or 30 frames per second) with the two fields interlaced to provide the video frame. This illustrative format would require a resolution equal to a bandwidth of 3.15 MHz. As will be explained, it is desired to convert the fast-scan signal having a bandwidth of 3.15 MHz. to slow-scan format with a bandwidth of 7.5 kHz. and a picture rate of 9 frames per 2 minutes (or 13.33 seconds per frame). In order to accommodate this illustrative mode of operation, the motor 30 rotates the storage medium 26 at a rate of 30 revolutions or cycles per second, the recording track 32 is prerecorded with a synchronizing signal of 525 pulses, and the track 33 is recorded with 2 pulses about its circumference.

As shown in FIG. 2, the synchronizing pulse prerecorded upon track 32 is played back through the head 40 and applied to a horizontal sweep generator 56. The synchronizing pulse prerecorded upon the track 33 is played back through the head 41 and applied to a vertical sweep generator 52. The vertical and horizontal sweep generators 52 and 56 generate appropriate sawtooth wave signals which are respectively applied to the vertical and horizontal deflection coils 54 and 58 to thereby sweep the electron beam in the desired pattern across the target of the source 12. Alternatively the sweep generators 52 and 56 may take the form of oscillators which are triggered in response to the synchronizing pulses received respectively from the tracks 32 and 33 of the storage medium 26. Thus, the horizontal sweep generator 56 will be triggered 525 times per revolution of the medium 26 to provide a sweeping pulse across the target of the source 12 and the vertical sweep generator 52 will be triggered twice per revolution or 60 times per second to vertically sweep the electron beam across the target of the source 12.

The fast-scan signal derived from the source 12 is applied to a fast-scan input gate 60 which controls the application of the fast-scan signal to a pair of read-write switching circuits 63 and 65. As shown in FIG. 2, the read-write switching circuit 65 is connected first to the recording head 49 and to the playback head 43. In a similar manner, the read-write switching circuit 63 is connected to recording head 48 and to the playback head 42. The read-write switching circuits 63 and 65 function to alternatively record and playback the fast-scan signal derived from the source 12 onto the recording tracks 34 and 35. For example, if the read-write switching circuit 65 is applying the fast-scan signal derived from the gate 60 to be recorded by the head 49 onto the track 35, the read-write switching circuit 63 is applying the signal derived through the head 42 from the track 34 to a sampling circuit 81. Alternatively, if the read-write switching circuit 63 is applying the fast-scan signal to the recording head 48, the read-write switching circuit 65 is applying the recorded signal derived from the playback head 43 to the sampling circuit 81. As a result, the fast-scan signal may be applied to one of the two recording tracks 34 or 35, while the other of the two recording tracks is simultaneously being played back. It is noted that in the fast-scan to slow-scan conversion system 18 shown in FIG. 2, the fast-scan signal is gated by the gate 60 and applied to one of the two tracks 34 or 35 during a relatively short period of time as compared to the time required for playing back and sampling the other track. Therefore, a single recording track could be used. More specifically, during the relatively short period that the fast-scan signal is being recorded, there would be no playback and this relatively small portion of the signal would be delayed, which would not be a disadvantage for many applications.

Illustratively, the input gate 60 may take the form of a monostable flip-flop circuit that will be triggered as will be explained later, to gate a single frame of the fast-scan video signal to be applied to the storage medium 26. The monostable circuit may illustratively have a time constant equal to the time period in which a single frame of the fast-scan signal is derived from the source 12. After a single frame of the fast-scan signal has been selected and applied, the monostable circuit of the gate 60 is cut off. Illustratively, the single frame of the fast-scan signal is applied to one of the tracks 34 or 35 during a single revolution of the storage medium 26. As will be explained later, the recorded fast-scan signal is repeatedly played back while the sampling circuit 81 periodically samples an elemental signal to provide the slow-scan output. In this illustrative method of operation, where the horizontal line is arbitrarily chosen to be made up of 400 picture elements, the storage medium 26 will be rotated 400 times thereby assuring a reduction of bandwidth by a ratio of 400 to 1.

In order to insure that the motor 30 rotates the storage medium 26 with an extremely accurate speed, the sync signal prerecorded upon the track 33 is played back through the head 41 and applied to a sync servo 67. The sync signal which takes the form of a 60 cycle per second clock pulse is compared by the sync servo 67 with an input line supply voltage having a corresponding 60 cycle per second waveform to apply a control signal to the motor 30. The control signal of the sync servo 67 therefore corrects for any variation in the speed of the rotating storage medium 30.

Referring now to FIG. 7, the raster or pattern with which the target of source 12 is scanned to derive the fast-scan output signal is shown. More specifically, the target of the source 12 is scanned in a typical horizontal interlaced mode whereby the first field of the fast-scan video signal is scanned, and then a second field which is interlaced or disposed between the lines of the first field is then scanned. As the beam of electrons is swept through the first horizontal line, a signal corresponding to the elements $1_1$, $2_1$, $3_1$, $4_1$—$m_1$ will be derived and applied to the fast-scan input gate 60. Next, the second line will be scanned to thereby derive a signal corresponding to the elements $1_2$, $2_2$, $3_2$, etc. $m_2$. In this manner the first field will be scanned line by line. In a similar manner the target will be rescanned to provide the second field on a line by line basis until the last line is scanned and a signal corresponding to points $1_N$, $2_N$, $3_N$—$M_N$ will be provided. As explained above, the fast-scan input gate 60 allows a single frame of video information to be selected and applied through one of the read-write switching circuits 63 or 65 to be recorded on the corresponding track 34 or 35.

In accordance with the teachings of this invention, the fast-scan signal, which is recorded illustratively within a single revolution of the recording medium 26, is then periodically sampled by the sampling circuit 81 during repeated revolutions or cycles of the storage medium 26. During the first revolution of the storage medium 26, the sampling circuit 81 will gate or sample in response to an input signal those portions or elements of the recorded fast-scan signal in a predetermined sequence in accordance with the teachings of this invention. More specifically, during the first revolution of the storage medium 26, the signal portions or elements corresponding to the elements $1_1$, $1_2$, $1_3$, $1_4$—$1_N$ will be sampled by the circuit 81 and applied through a filtering circuit 85 to be applied to the transmission system 20. The slow-scan distributed output signal will appear as a series of distributed pulses appearing in the order of the sampled signal. During the second revolution of the storage medium 26, the portions of the signal corresponding to the elements $2_1$, $2_2$, $2_3$,—$2_N$ will be sampled. In this manner the storage medium 26 will be cycled or revolved M times so that the sampling circuit 81 may selectively derive pulses or elemental portions of the signal corresponding to each of the elements of the signal corresponding to each of the elements of a horizontal line. In one illustrative example, where a single horizontal line is chosen to be made up of 400 elements, the storage medium 26 will be rotated 400 revolutions or cycles.

In accordance with the teachings of this invention, the sampling is carried out by the circuit 81 in a manner to retain the vertical structure of the image whose video signal is being compressed. In other words, the video signal is so sampled that the slow-scan sequence of pulses corresponds to individual vertical lines. For example, the first line of the slow-scan signal would be the first vertical line composed of elements $1_1$, $1_2$, $1_3$-

—$1_N$ as shown in FIG. 7. Subsequently, each of the remaining vertical lines would be sampled in order, going from left to right as shown in FIG. 7, until the vertical line composed of elements $M_1$, $M_2$, $M_3$—$M_N$ would be sampled and applied to the low bandwidth transmission system 20.

Such a method of sampling has the advantage that the low bandwidth distributed signal is transmitted or stored in a form that retains a line structure and could be displayed on a long persistence display medium, such as a cathode ray tube with a long persistence phosphor. Another advantage of this method of sampling is its flexibility with regard to bandwidth reduction, picture duration and resolution. More specifically, the video image may be reproduced with a different number of horizontal lines per frame as compared with the original frame. The slow-scan signal is a continuous waveform and if sampled at different rates from that used in its generation, vertical interpolation is automatically achieved. Although the information content of the picture cannot be increased by such an interpolation, the original information can be presented with twice the number of horizontal lines by resampling at twice the rate. Such a technique may be useful in reducing the subjective imperfection caused by the line structure in large size displays. In addition, it permits standard conversion from one television standard to another.

Figure 9A:
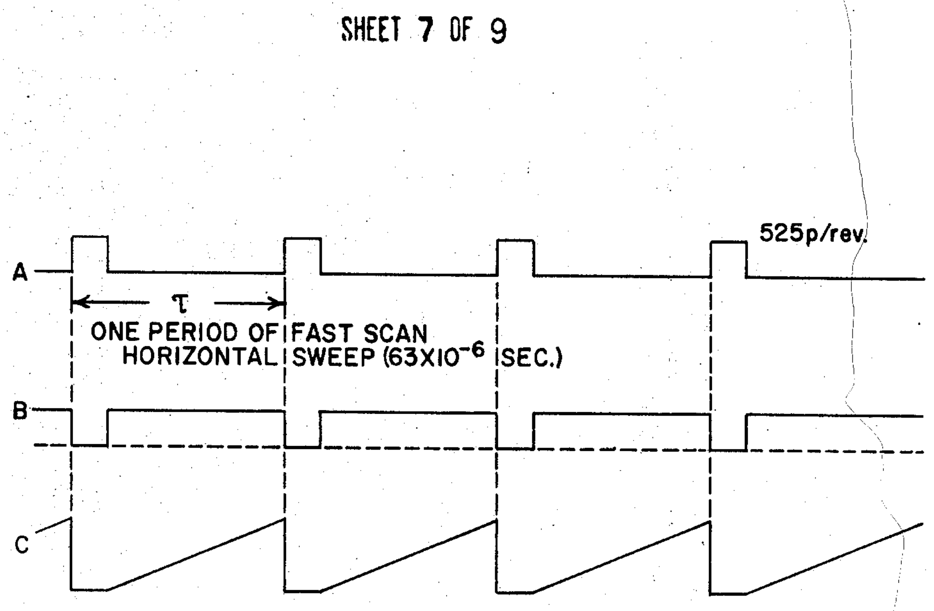
FIGS. 9A, 9B and 9C are graphical representations of the processing of the signal which takes place within the band conversion system shown in FIG. 2.

Referring now to FIG. 2, it is necessary to gate or trigger the sampling circuit 81 at prescribed intervals of time in order to sample the continuous fast-scan video signal that is recorded upon one of the tracks 34 or 35. An appropriate triggering signal which is applied to the sampling circuit 81 is developed as will be now explained from the sync signals prerecorded upon the recording tracks 32 and 33. More specifically, the sync or clock signal having 525 pulses per revolution of the storage medium 26 is played back through the head 40 and applied to a stabilizer circuit 69. Referring now to FIG. 9A, the signal derived from the playback head 40 is shown at line A and takes the form of a series of pulses having a period $\tau$ corresponding to the period of the fast-scan horizontal sweep. In other words, the period $\tau$ is equal to the period of time it would take for the electron beam to scan a single line of the target of the source 12. With regard to FIG. 7, the period $\tau$is the time it would take the electron beam to sweep along the horizontal line from element $1_1$ and back to element $1_2$. Waveform A is applied to the stabilizer circuit 69 which produces an output taking the waveform B as shown in FIG. 9A. In one illustrative mode of operation, the stabilizer circuit 69 clamps the upper portion of the input waveform A to O volts while the remaining portion of waveform A is disposed at a second positive value. The waveform B derived from the stabilizer circuit 69 is applied to an integration circuit 73, which functions to integrate waveform B to provide a waveform C having a series of ramps whose period is likewise $\tau$. As shown in FIG. 2, the waveform C derived from the integration circuit 73 is applied to a flip-flop circuit 77. The integration circuit 73 is reset by the sync signal, i.e. waveform A, derived from track 32. As shown in FIG. 9A, the output signal of the integration circuit 73 is returned to a reference level at intervals of period $\tau$.

Figure 9B:
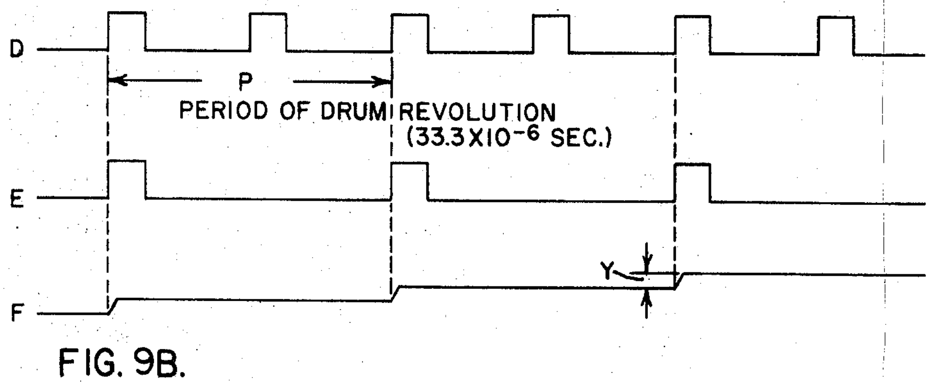

The sync signal derived from the recording track 33 through the playback head 41 appears in FIG. 9B as waveform D. The waveform D is a series of pulses which are spaced apart so that 2 pulses appear per revolution of the recording medium 26. Waveform D is applied to a dividing circuit 71, which in this illustrative embodiment divides the number of pulses of the waveform D by the factor 2 to provide a signal taking the form of waveform E as shown in FIG. 9B. The waveform E now provides a single pulse per revolution of the storage medium 26 and is applied to an integration circuit 75 and likewise to a dividing circuit 83. The output signal from the integration circuit 75 is shown as waveform F of FIG. 9B and includes a series of increasing ramps whose period P corresponds to a single revolution of the drum or storage medium 26. The amplitude of the ramp increases by an increment designated in FIG. 9B as Y for each revolution of the drum or storage medium 26. The increment Y corresponds to the number of revolutions or cycles that the storage medium 26 is revolved, while the circuit 81 samples the fast-scan signal. In the particular embodiment described herein with respect to FIG. 2, the amplitude of the steps of waveform F will be incrementally increased by a value Y through 400 steps and then reset to a reference or zero level by a signal derived from the dividing circuit 83. As shown in FIG. 2, the waveform F is applied to the flip-flop circuit 77.

The waveform E derived from the dividing circuit 71, which takes the form of a single pulse per revolution of the drum, is applied to the dividing circuit 83 which provides an output signal having a single pulse for each 400 revolutions of the storage medium 26. The duration of the interval of the pulses derived from the circuit 83 corresponds to the length of time required for the sampling of the fast-scan signal disposed on one of the recording tracks 34 or 35. After the entire slow-scan sampling process has taken place, it is necessary to reset the integration circuit 75 back to its reference or zero level so that the next fast-scan signal which has been recorded upon the other of the two tracks 34 or 35 may now be processed.

In a similar manner the output signal from the dividing circuit 83 is applied to the read-write switching circuits 63 and 65 to cause the circuits 63 and 65 to alternate their processing. Therefore, if read-write switching circuit 63 had been applying the fast-scan input signal to the recording head 48, the switching circuit 63 would now function to apply the signal derived from the recording head 42 to the sampling circuit 81. In a similar manner, the read-write switching circuit 65 would change its mode of operation from that of recording upon through the head 49 to that of playing back from the recording head 43. Thus, after a single frame of the video signal has been played back and sampled by the sampling circuit 81, a second frame of the fast-scan signal will be recorded upon that particular recording track, while a second sampling process is being carried out upon the signal applied to the other recording track. As shown in FIG. 2, the output signal derived from the dividing circuit 83 is also applied to an indicator light 89 to indicate the start of a new cycle so that the operator of this system may present a new field 16 to be viewed by the source 12.

Figure 9C:
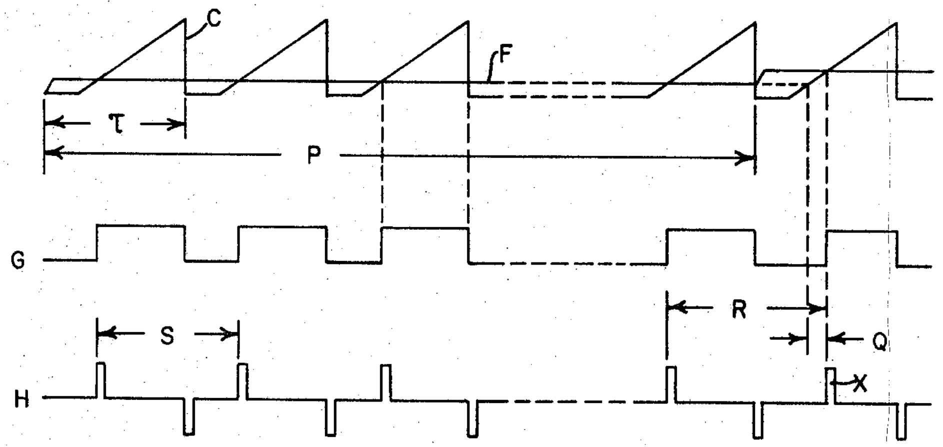

Referring now to FIGS. 2 and 9C, signals C and F derived respectively from integration circuits 73 and 75 are applied to the flip-flop circuit 77. The flip-flop circuit 77 functions to provide an output signal of a first value during that period of time in which the amplitude of waveform C exceeds the amplitude of waveform F, and a second, lower value during that period of time in which the amplitude of waveform C is less than the amplitude of waveform F. The output signal from the flip-flop circuit 77 is shown as waveform G in FIG. 9C and includes a plurality of pulses whose duration depends upon the points of interception of the ramps of waveform C with the steps of waveform F. The output signal G derived from the flip-flop circuit 77 is applied to the differentiating circuit 79 which provides an output signal having the waveform H as shown in FIG. 9C. The waveform H takes the form of a series of spikes or pulses corresponding to the leading and trailing edges of the pulses of waveform G. The waveform H is applied to the sampling circuit 81, which is designed to be triggered by input signals above a given amplitude. As a result, only the positive going pulses of waveform H serve to trigger the sampling circuit 81. As shown in FIG. 9C, the intervals between the positive going pulses of waveform H is substantially equal to the period $\tau$. As a result, the sampling circuit 81 samples the fast-scan video signal recorded upon the storage medium 26 at an interval corresponding to a period of the fast-scan horizontal sweep. In other words, the sampling circuit will be triggered at points in time corresponding to the vertical picture elements upon successive horizontal lines as shown in FIG. 7.

As shown in FIG. 9B, at the end of the interval P corresponding to a single revolution of the drum 26, the amplitude of the waveform F is increased by the value Y. The result of the increased amplitude is that the next pulse of waveform G designated X in FIG. 9C is delayed by an interval time. As seen in FIG. 9C, the point at which the waveform F intersects the second step of waveform F, and therefore the pulse X of waveform G is delayed due to the increase in the ramp amplitude of waveform F. Thus, the interval R between the last spike corresponding to the first step and the first spike X of the second step waveform F is greater than the interval S by an amount designated in FIG. 9C as Q. The amount of the delay Q is determined by the increase Y between the steps of waveform F so that interval Q equals the time period of a single picture element of the video image. In this illustrative method of sampling, the length of a picture element is equal to 1/400 of the period of a single horizontal scan. As will be explained later in detail, it is necessary to delay the sampling elements of the slow-scan signal between successive revolutions of the storage medium 26 so that the slow-scan signal may be recorded and built up during successive revolutions of the storage medium 26. The resultant output signal from the fast-scan to slow-scan conversion system 18 is derived from a filtering circuit 85 and takes the form of a slow-scan distributed signal in which the elemental portions appear successively as the elemental points of the vertical lines of the image as shown in FIG. 7.

Figure 3:
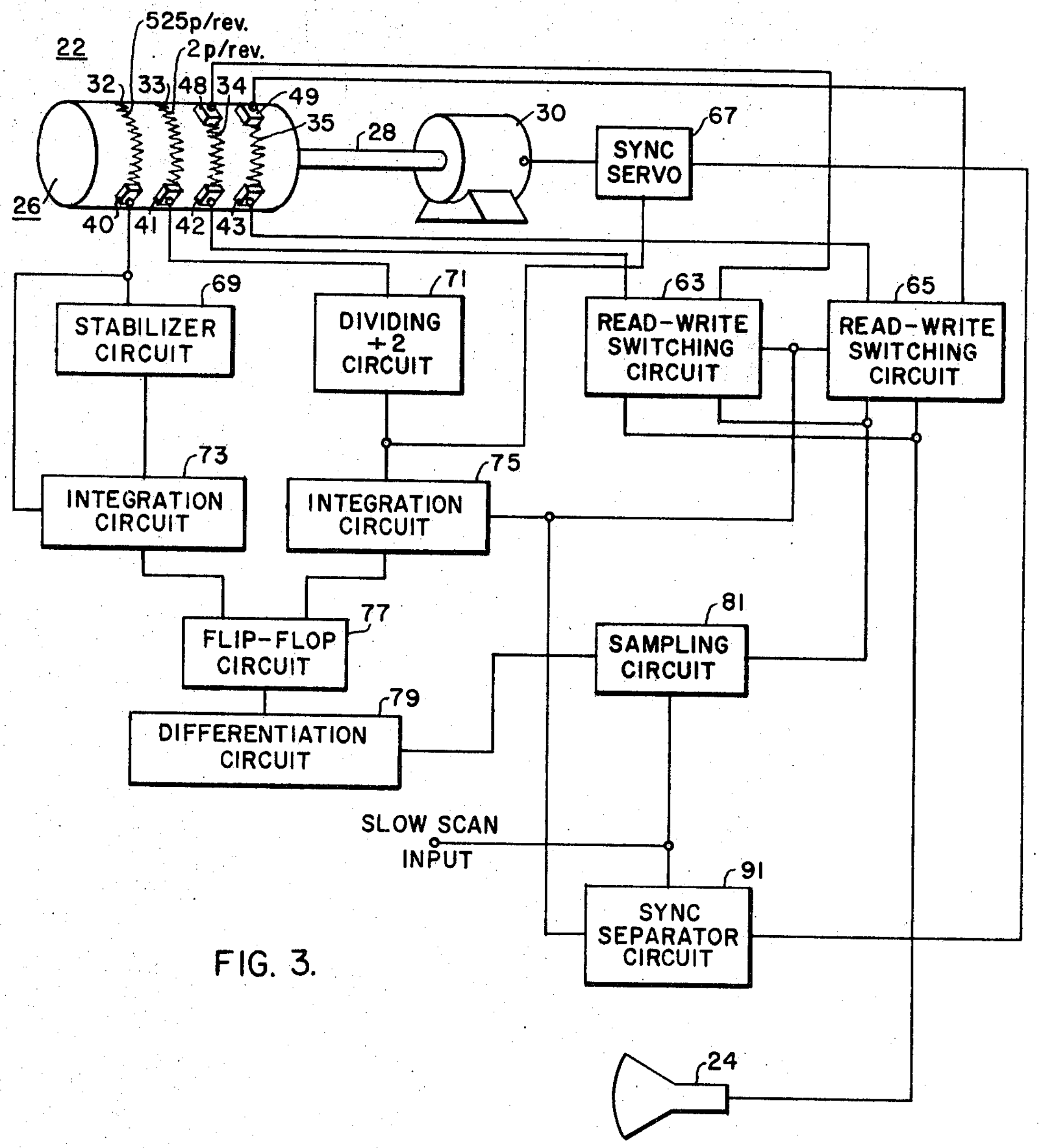
FIG. 3 shows a schematic diagram of a slow-scan to fast-scan bandwidth conversion system in accordance with the teachings of this invention.

The slow-scan input signal as derived from the low bandwidth transmission system 20 is applied to the slow-scan to fast-scan conversion system 22 which may take the illustrative form of the circuit as shown in FIG. 3. Basically, the conversion system 22 includes the sampling circuit 81, which samples the slow-scan input signal in a manner to build up during successive revolutions of the storage medium 26 a complete frame of video information, which may be read off rapidly during a single revolution of the storage medium 26. It is noted that the circuits making up the conversion system 22 are similar to those of the fast-scan to slow-scan conversion system 18 and are designated by similar numerals; however, in order to effect the desired fast-scan to slow-scan conversion the circuits are related to each other in a different order as will now be explained. The slow-scan input signal is applied to the sampling circuit 81 and to a sync separator circuit 91. Sync separator circuits are well known in the art and function to separate the sync pulses associated with input video signals. It may be understood that as the video signal is derived from the target element of the source 12 there will be a brief blanking period at the end of each horizontal sweep of the electron beam in which no output signal is being derived. Similarly, once the target has been swept in a field, it is necessary to sweep the electron beam vertically back to its initial starting position during which period there is no output signal. These periods in which there are no output signals form effective sync signals which are used to restore the original video format. Thus, the sync separator circuit 91 derives from the slow-scan input signal a sync signal corresponding to the vertical scan rate and applies it to the sync servo 67 for accurately controlling the speed of the motor 30. In a similar manner, the sync separator 91 applies the field sync signal to the integration circuit 75 and to the read-write switching circuits 63 and 65. In response to the triggering signal derived from the differentiating circuit 79, the sampling circuit 81 is gated to apply the slow-scan input signal to the read-write switching circuits 63 and 65. The read-write switching circuits 63 and 65 function to alternate the inputs slow-scan signal to one of the two recording tracks 34 or 35. As will be explained later in detail, it requires many revolutions of the storage medium 26 to build up a complete video frame upon one of the two tracks 34 or 35. While the video frame is being developed on one of the two tracks, the other recording track is being played back as controlled by the read-write switching circuits 63 and 65 to be applied to the display device 24. During each revolution of the storage medium 26, the video signal is being repeatedly played back with each revolution of the storage media 26 to thereby continuously display the video frame that has been previously built up during many revolutions of the drum. After a first frame of information has been built up, the sync separator circuit 91 will apply the field sync signal to the read-write switching circuits 63 and 65 to thereby change their mode of operation from reading to writing, or writing to reading depending upon their original state.

As explained above with regard to FIG. 2, the triggering signal applied to the sampling circuit 81 is derived from the synchronizing signals previously recorded upon the tracks 32 and 33 and played back respectively through the play back heads 40 and 41. Illustratively, a synchronous signal having 525 pulses or cycles per revolution of the storage medium 26 is applied to the stabilizer circuit 69 which in turn applies its output signal to the integration circuit 73. The 60 cycle per second synchronous signal derived from the track 33 is applied to the driving circuit 71 which in turn applies its output signal to the integration circuit 75 and to the sync servo 67. In a manner similar to that described before, the sync servo 67 compares the clock signal derived from the dividing circuit 71 and the vertical sync signal derived from the sync separator circuit 91 to apply a correction signal to the motor 30 thereby insuring that the storage medium 26 is rotated at the correct speed. The output signals derived from the integration circuits 73 and 75 are applied to the flip-flop circuit 77 whose output signal is differentiated by the circuit 79 to provide the triggering signal which is applied to the sampling circuit 81. As explained above in detail, the triggering signal resembles the waveform H as shown in FIG. 9C. The input triggering signal includes a series of equally spaced pulses separated by a period S equal to a horizontal scan period. After a single revolution of the storage medium 26, a delay of a period Q equal to one picture element of video information is introduced to allow signals sampled on successive revolutions of the storage medium 26 to be accurately placed upon one of the tracks 34 or 35.

Figure 8A:
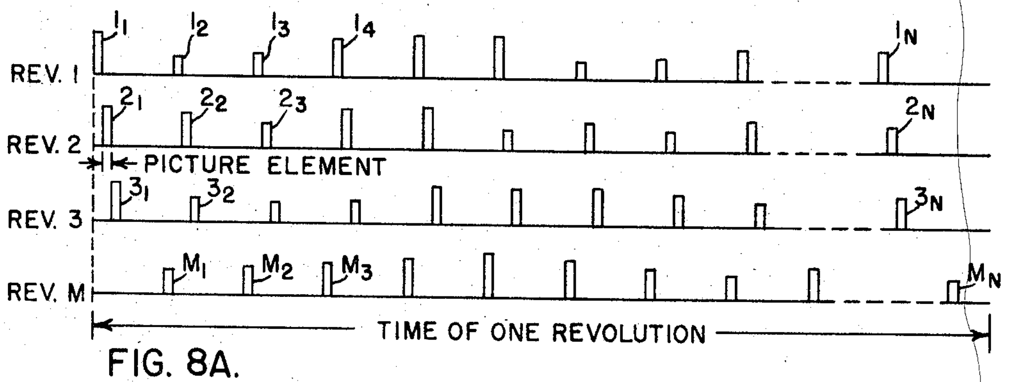
FIGS. 8A and 8B are graphical representations of the recording of the picture elements of pulses upon the storage medium of FIG. 2.

Referring now to FIG. 8A, there is shown the state of one of the tracks 34 or 35, during the successive revolutions of the storage medium 26. By comparing FIGS. 8A and FIG. 7, it may be seen that the elements $1_1$, $1_2$, $1_3$—$1_N$ corresponding to the first vertical line of the scan pattern shown in FIG. 7 are recorded at intervals corresponding to the horizontal scan period about the entire circumference of one of the recording tracks 34 or 35. During the next revolution of the storage medium 26, the picture elements $2_1$, $2_2$, $2_3$—$2_N$ corresponding to the second vertical line of the scan pattern shown in FIG. 7 are recorded upon the same track but are spaced by one picture element so that they will not erase or be superimposed upon the picture elements during the first revolution.

Figure 8B:
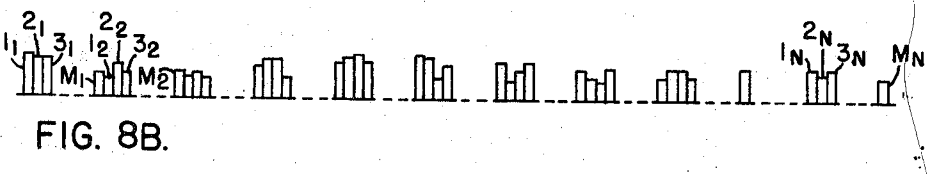

The storage medium 26 will be rotated M times (corresponding to the selected number of picture elements) during which successive vertical lines will be recorded onto the storage medium 26 until a complete video frame of a series of horizontal lines have been built up upon the storage medium 26. As shown in FIG. 8A, during Mth revolution of the storage medium 26, the pulses $M_1$, $M_2$,—$M_N$ corresponding to the Mth vertical row are placed upon the storage medium 26 in a manner to be adjacent to those pulses or signal portions recorded during the first revolution. Referring now to FIG. 8B, there is shown illustratively the sequence of a complete frame of video information which has been built up during M revolutions. It is noted that the sequence of elements now corresponds to the normal horizontal scan pattern. More specifically, the first series of elements $1_1$, $2_1$, $3_1$—$M_1$ make up the first horizontal line of video information as shown in FIG. 7. Similarly, the next sequence of pulses makes up the second horizontal line. In a similar manner the remaining elements or pulses constitute the remaining portions of the first field and second field of the video frame in a horizontal pattern with the last series of elements $1_N$, $2_N$, $3_N$—$M_N$ making up the last horizontal line. After a single frame of information has been built up upon one of the storage tracks 34 or 35 resembling the sequence of pulses shown in FIG. 8B, the read-write switching circuits 63 and 65 will be switched so that this track is readout and the fast-scan, horizontal pattern of video information is applied to the display means 24 to repeatedly display the video frame while the next frame of slow-scan information is being built up upon the other recording track.

Though the sampling of the signal recorded onto the storage medium 26 may be performed at the same relative points in time with respect to the waveform, the timing of the sampling may be varied. It may be understood that low bandwidth distributed signal derived from the filtering circuit 85 has a modulated (or smoothed) waveform. This distributed signal may be sampled at various points in time and at a faster or slower rate in order to change the format of the displayed image, as described above.

Figure 4:
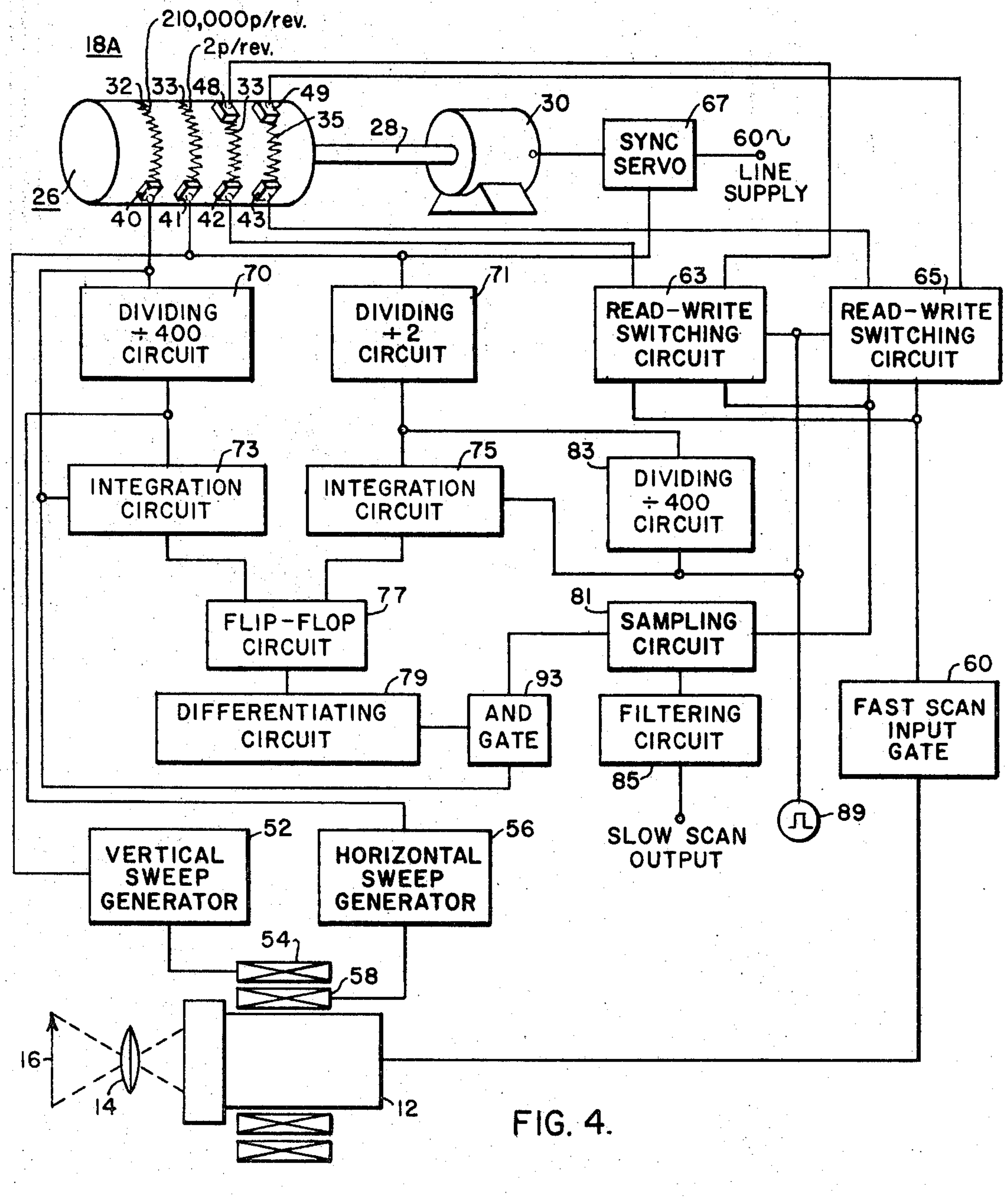
FIGS. 4 and 5 shows alternative embodiments of the fast-scan to slow-scan band compression system of this invention.

Referring now to FIG. 4, there is shown an alternative embodiment 18A of the fast-scan to slow-scan conversion system of this invention. In this alternative system, a clock waveform having 210,000 pulses per rotation is prerecorded upon the recording track 32 of the storage medium 26. This synchronous signal is played back through the playback head 40 and is applied to a dividing circuit 70 which provides an output signal having 525 pulses per rotation of the storage medium 26, and also to the integrating circuit 73. As explained above with regard to FIG. 2, a pulse waveform having 525 pulses per revolution is applied to the integration circuit 73 whose output signal is applied to the flip-flop circuit 77. In a manner similar to that explained above with regard to FIG. 2, a synchronous signal having two pulses per revolution of the storage medium 26 is played back through the head 41 and applied to the dividing circuit 71 whose output signal is in turn applied to the integration circuit 75. Similarly, the output signal of the integration circuit 75 is applied to the flip-flop circuit 77, which functions to provide a series of pulses during those periods of time when the output derived from the integration circuit 73 exceeds the amplitude of the signal derived from the integration circuit 75. In a similar manner, the output from the flip-flop circuit 77 may be applied to the differentiating circuit 79 to provide a series of pulses for triggering the sampling circuit 81. In this embodiment 18A of the invention the integration circuit 73 integrates the pulses from track 32 and is reset by the output signal of the dividing circuit 70. Thus, the output signal of the integration circuit 73 resembles generally the ramp waveform C of FIG. 9A. More specifically, the output of the integration circuit 73 would be a series of ramps at a rate of 525 times per rotation of the storage medium 26. Further, due to the higher rate of the resetting signal derived from the dividing circuit 70, the waveform C of FIG. 9A takes the form of a series of steps at the higher rate of 210,000 steps per revolution of the storage medium 26. The steps in the waveform of the output signal of the integration signal 73 occur at the rate equivalent to 400 steps per ramp. As a result, the series of steps provide a more positive location of the operating point of the flip-flop circuit 77, thereby achieving a more accurate timing of the leading edges of the output signal of the circuit 77. If even greater time stability is required, a coincident gate 93 may be inserted between the differentiating circuit 79 and the sampling circuit 81 to be triggered by the synchronizing signal derived from the playback head 40. The effect of inserting the AND gate 93 would be to keep the timing of the sampling pulses tied to the higher frequency waveform i.e., 210,000 pulses per revolution.

Figure 5:
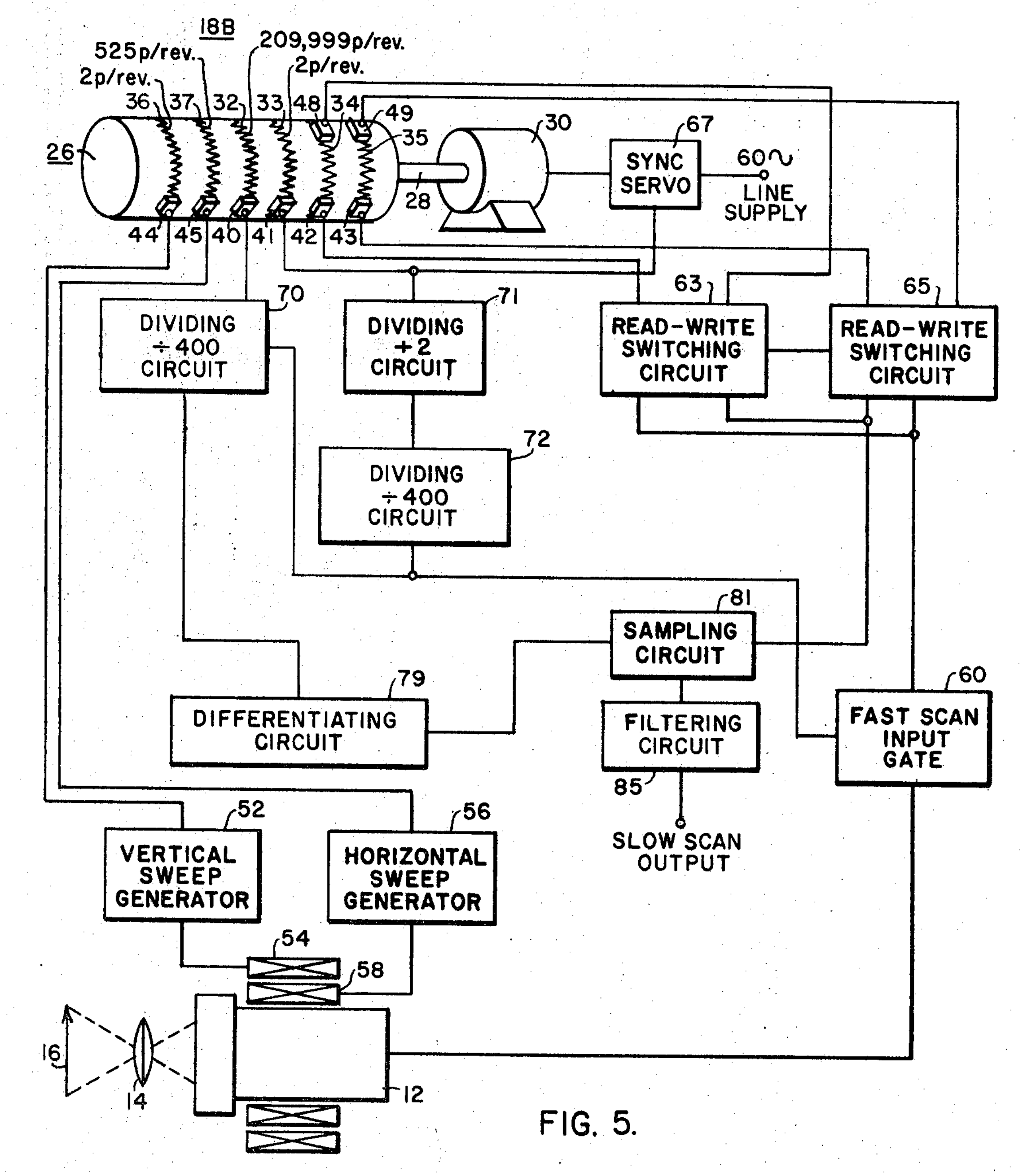

Referring now to FIG. 5, there is shown an alternative embodiment 18B of the fast-scan to slow-scan conversion of this invention utilizing many of the elements and circuits shown in the embodiment of FIG. 2 which are likewise designated by the same numbers. This system and method differs from that shown with regard to FIG. 2 in the manner of obtaining the delay in the sampling timing after each rotation of the storage medium 26. Instead of using a pair of integration circuits, the delay change is determined by a frequency difference between the sampling rate of the triggering signal applied to the sampling circuit 81 and the picture element rate. As shown in FIG. 5, a clock waveform having 209,999 pulses per revolution is prerecorded upon the recording track 32 and is played back through the playback head 40 to be applied to the dividing circuit 70. The dividing circuit 70 divides the clock waveform by 400 and applies the resulting output signal to the differentiating circuit 79. The output signal derived from the dividing circuit 70 is a fraction less than 525 pulses per revolution; the leading edges of the output signal derived from the circuit 70 are differentiated to provide a series of sharp spikes or pulses which serve to trigger the sampling circuit 81. A prerecorded signal of two pulses per revolution is played back through the head 41 and is applied to the dividing circuit 71, which provides in turn a signal to a dividing circuit 72. The output signal derived from the dividing circuit 72 is one pulse per 400 revolutions of the storage medium 26 and serves to trigger the fast scan input gate 60 and to reset the dividing circuit 70. As explained before, the fast-scan input gate 60 serves to allow a single frame of fast-scan signal derived from the source 12 to be recorded upon one of the recording tracks 34 or 35. The vertical and horizontal fast-scan sync signals are recorded upon a set of tracks 36 and 37 and are played back respectively through heads 44 and 45 to apply appropriate sync signals to the vertical and horizontal sweep generators 52 and 56.

Figure 11A:
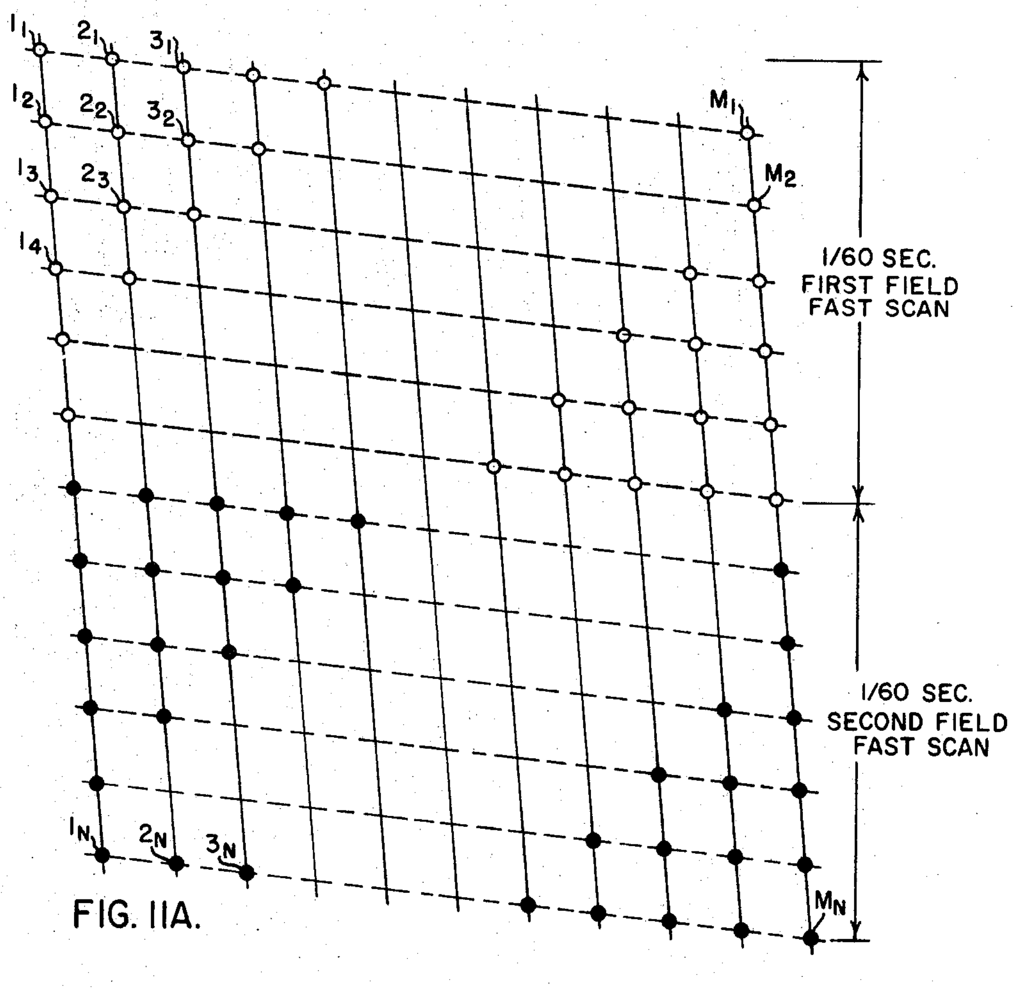
FIGS. 11A and 11B illustrate the scan pattern which may be used by the television camera device of FIG. 5.

The prerecorded clock waveform recorded upon the track 32 contains 209,999 pulses per rotation of the storage medium 26 as compared with the 210,000 elements per frame of information derived from the source 12 and applied to the fast-scan input gate 60. As explained above, the triggering signal derived from the differentiating circuit 79 and applied to the sampling circuit 81 is a series of pulses with a frequency slightly less than 525 per rotation. Referring now to FIG. 11A, the resulting sampling structure is a series of vertical lines which drift because the sampling of the vertical pulses is successively delayed to a slight degree due to the frequency difference between the sampling rate and the rate at which pulses are applied to the sampling circuit 81. Thus, after a single revolution of the storage medium 26, the pulse corresponding to the element $1_N$ is delayed by a full picture element. As shown in FIG. 11A, the pulse making up the first vertical line including elements $1_1$, $1_2$, $1_3$, — $1_N$ are each successively delayed, with element $1_N$ being delayed a full picture element. In a similar manner, each of the successive vertical lines are sampled at rates introducing a one element delay per line of scan so that when the slow-scan signal is recorded upon the storage medium 26 by a slow-scan to fast-scan conversion system, the successive vertical lines of the slow-scan video signal are recorded on successive revolutions of the drum so that adjacent pulses do not overlap or erase each other as shown in FIGS. 8A and 8B.

Figure 11B:
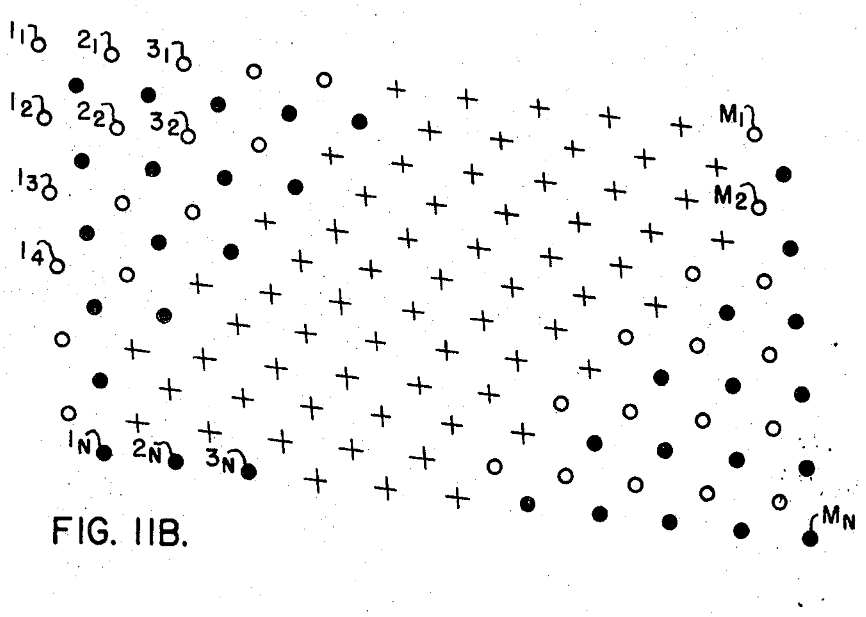

After a single frame of information has been played back from one of the recording tracks 34 or 35 during 400 revolutions of the storage medium 26, a reset pulse derived from the dividing circuit 72 is applied to the dividing circuit 70 to resynchronize the output of the dividing circuit 70 with the new fast-scan signal that is being played back from one of the tracks 34 or 35 to the sampling circuit 81. It is noted that a single element per frame of information will be lost due to the fact that only 209,999 pulses per frame are now being sampled by the circuit 81; however, the loss of a single element in a frame of video information is not normally significant. Further, if a sampling waveform of 209,998 is prerecorded upon the track 32, the displacement between successive vertical lines of the scan pattern as shown in FIG. 11A will be two elements per revolution, and the resultant display picture as shown in FIG. 9B will have one-half the resolution of the original fast-scan video signal. As shown in FIG. 11B, the restored, interlaced image will be an image with both vertical and horizontal interlacing. More specifically, the first vertical line associated with the second field will be displaced from the first line of the first field by a picture element, and the second vertical line of the first field will be displaced from the first vertical line of the first field by two elements.

Figure 6:
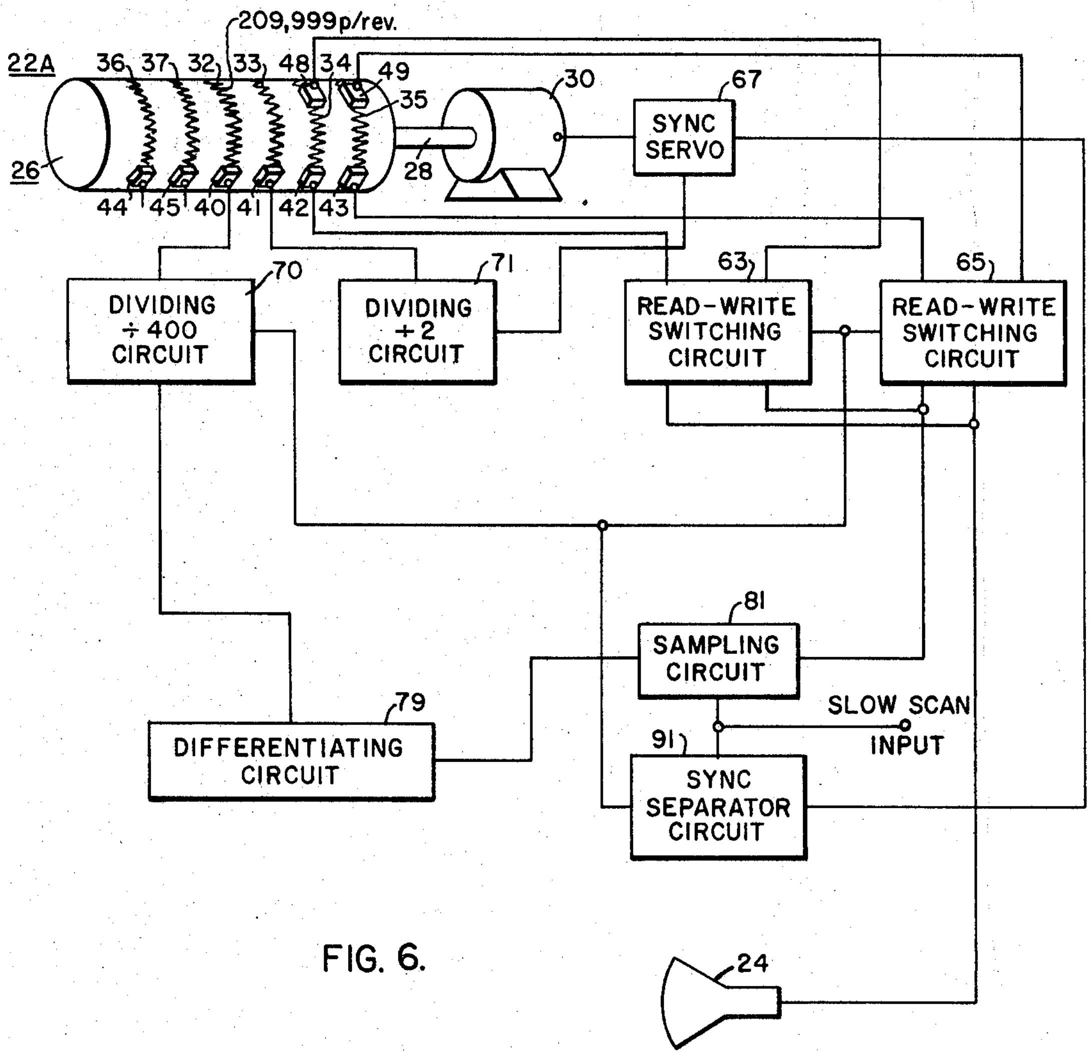
FIG. 6 shows a schematic diagram of an alternative embodiment of the slow-scan to fast-scan bandwidth conversion system of this invention.

Referring now to FIG. 6, there is shown an alternative embodiment 22A of the slow-scan to fast-scan system shown in FIG. 3. More specifically, the embodiment 22A differs from the previous embodiment by effecting the sampling delay after each rotation of the storage medium 26 by providing a frequency difference between the sampling rate and the picture element rate. Thus, the slow-scan signal as derived from the embodiment 18B of FIG. 5 could be applied to the sampling circuit 81 and the sync separator circuit 91 of FIG. 6. The sync separator circuit 91 would separate the vertical and frame sync pulses associated with the input slow-scan signal and apply the vertical sync signal to the dividing circuit 70 and the frame sync signal to the sync servo 67. As shown in FIG. 6, the speed of the motor 30 is controlled by an input signal derived from the sync servo 67, which functions to compare the vertical sync signal derived from the slow-scan input signal and the prerecorded sync signal derived from the recording track 33 through the dividing circuit 71. In a manner similar to that described with regard to FIG. 5, a prerecorded waveform containing 209,999 pulses per rotation is prerecorded upon the track 32 of the storage medium 26 and is applied through the dividing circuit 70 and the differentiating circuit 79 to trigger the sampling circuit 81. Due to the difference between the prerecorded waveform of 209,999 pulses and the information content of 210,000 pulses per frame of the slow-scan input signal, a displacement of one element per revolution of the storage medium occurs so that the elements of the pulses recorded during the second revolution of the drum are displaced one element from the pulses recorded during the first vertical line of the slow-scan input signal. Thus, successive vertical lines of the slow-scan input signal may be recorded during corresponding revolutions of the storage drum as shown in FIG. 8A to provide after 400 revolutions of the storage medium 26 a video signal having the desired horizontal scan format, i.e., the elements disposed in horizontal rows and in adjacent positions without overlapping each other.

Figure 10A:
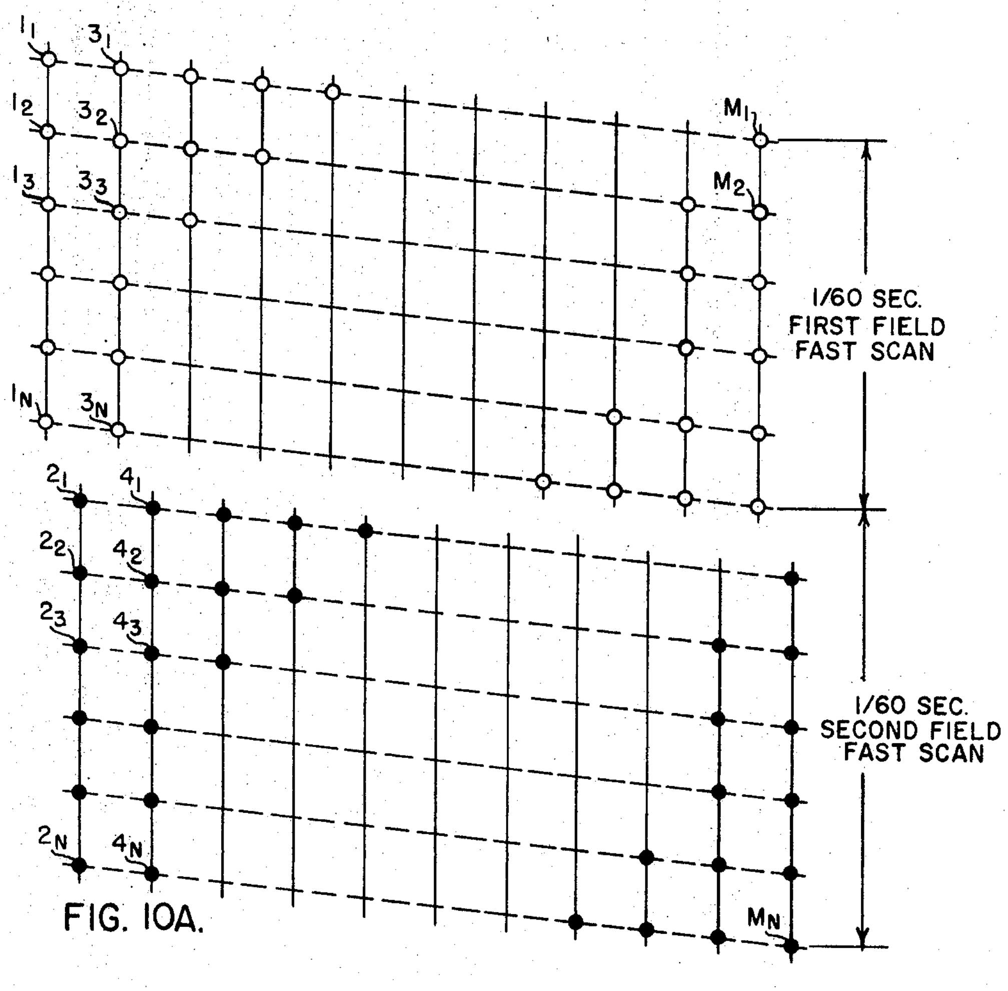
FIGS. 10A and 10B are graphical representations of alternative scan patterns which may be used by the television camera device shown in FIG. 2.
Figure 10B:
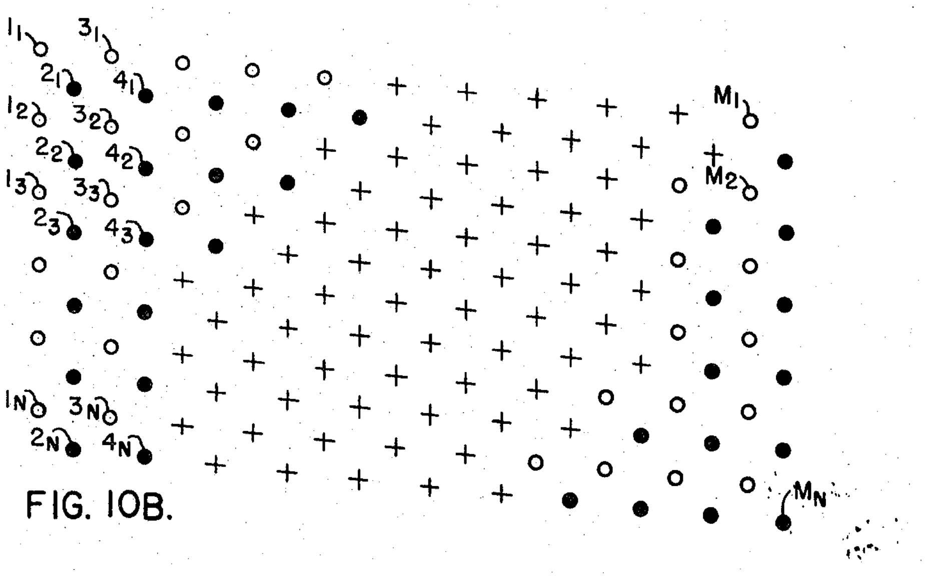

Referring now to FIGS. 10A and 10B, the sampling structure of these scan formats can be obtained by altering the fast-scan to slow-scan conversion system of FIG. 2 by omitting the dividing circuit 71 and applying the prerecorded two pulse per revolution signal recorded upon track 33 directly to the integration circuit 75. The result of such an alteration would be that the number of pulses applied to the integration circuit 75 would be doubled and the output waveform F as shown in FIG. 9B would appear as a series of ramps having one-half the period assuming the same displacement Y. Providing that the amplitude of the waveform C as provided by the integration circuit 73 remains the same, the time period for sampling each slow-scan frame will remain the same while a number of samples per complete picture is cut in half.

As described above, video recording can be performed upon one track for each complete picture, i.e., either track 34 or 35. In the alternative, a plurality of tracks may be used to record each frame. If analogue recording or phase modulation recording is employed, one recording track may be sufficient. Alternatively, it may be desired to employ digital recording and this may require a plurality of recording tracks. For example, if a six-bit representation of brightness is required, the samples of the slow-scan picture may be fed to an analog-to-digital converter providing six parallels outputs to six tracks. For replay, the outputs from the six set of tracks are fed to a parallel input, digital-to-analog converter, the output of which is supplied to the sampling circuit 81 for conversion to slow-scan, or to the output terminal for fast-scan readout.

The video scan conversion system and methods described above are extremely flexible and may be adapted to many applications. A principal advantage of the system and method is that the slow-scan signal retains a recognizable line form which may be monitored by suitable devices such as a cathode ray tube with a long persistence phosphor. Further, due to the continuous waveform nature of the slow-scan signal the signal may be sampled at rates different from that used in its generation to achieve vertical interpolation. Further, loss of resolution caused by the "aperture" of the camera electron beam or by imperfections in the overall response of the system can normally be corrected only in the horizontal direction on display pictures. With the slow-scan system of this invention, aperture correction can also be effected in a vertical direction by operation on the slow-scan waveform. Another valuable advantage of this system is that if the storage medium does not have sufficient resolution for the required video picture on a single track, the system may be easily adapted to store the picture multiplexed onto one or more tracks by connecting each alternate sample to alternate recording heads. By this means, it is possible to arrange an economic balance between performance of the storage medium per track, and the number of tracks with the aid of well known switching circuits. Still another advantage of this system is that the programming instructions for sampling either the input or output signal may be easily recorded on another track of the same storage medium.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

We claim:

1. A bandwidth conversion system including:

means for storing a video signal comprised of a first set of lines made up of a plurality of elements;

said means for storing including a continuous loop storage medium and means for continuously recycling said storage medium;

said storage medium including a first track for storing said video signal, a second and a third track for respectively storing a first clock waveform indicative of the period of said lines of said first set and a second clock waveform indicative of the period of recycling of said medium;

means for repeatedly reproducing said video signal;

means for sampling said video signal as derived from said means for storing for different replays of said video signal to provide a sampled signal wherein the consecutive elements of said sampled signal are derived from different lines of said first set to thereby form a second set of lines forming said image;

a first integration circuit for providing in response to said first clock waveform a first output signal taking the form of a plurality of ramps of a period equal to the period of said lines of said first set;

a second integration circuit for providing in response to said second clock waveform a second output signal taking the form of a series of ramps having a period equal to the period of revolution of said storage medium; and a flip-flop circuit to which said first and second output signals are applied, said flip-flop circuit providing an output signal which is applied to said means for sampling for the activation thereof at intervals equal to the period of said lines of said first set and to delay activation of said means for sampling between successive recyclings of said storage medium by one of said elements.

2. The bandwidth conversion system of claim 1 includes:

means for resetting said first integration circuit at a period equal to said lines of said first set; and means for resetting said second integration circuit after a period corresponding to that of said image.

3. A bandwidth conversion system including:

means for storing a video signal comprising a first set of lines made up of a plurality of elements;

said means for storing including a continuous loop storage medium and means for continuously recycling said storage medium;

said storage medium including a first track for storing said video signal, a second track for storing a clock waveform having a number of cycles less than the number of elements of said video signal;

means for repeatedly reproducing said video signal;

means for sampling said video signal as derived from said means for storing for different replays of said video signal to provide a sampled signal wherein the consecutive elements of said sampled signal are derived from different lines of said first set to thereby form a second set of lines forming said image; and means for applying said clock signal to said means for sampling to thereby provide the delay in the timing of said means for sampling between successive recyclings of said storage medium.

4. The bandwidth conversion system of claim 3 wherein:

said clock waveform contains one cycle less than the number of elements of said video signal; and said means for applying divides said clock waveform by a factor equal to the number of revolutions of said storage medium that is required to build up said video signal.

5. The bandwidth conversion system of claim 3 wherein said clock waveform has more than one cycle less than the pulses of said video signal to thereby provide a reduction of the resolution of said video signal.